Figure 3:
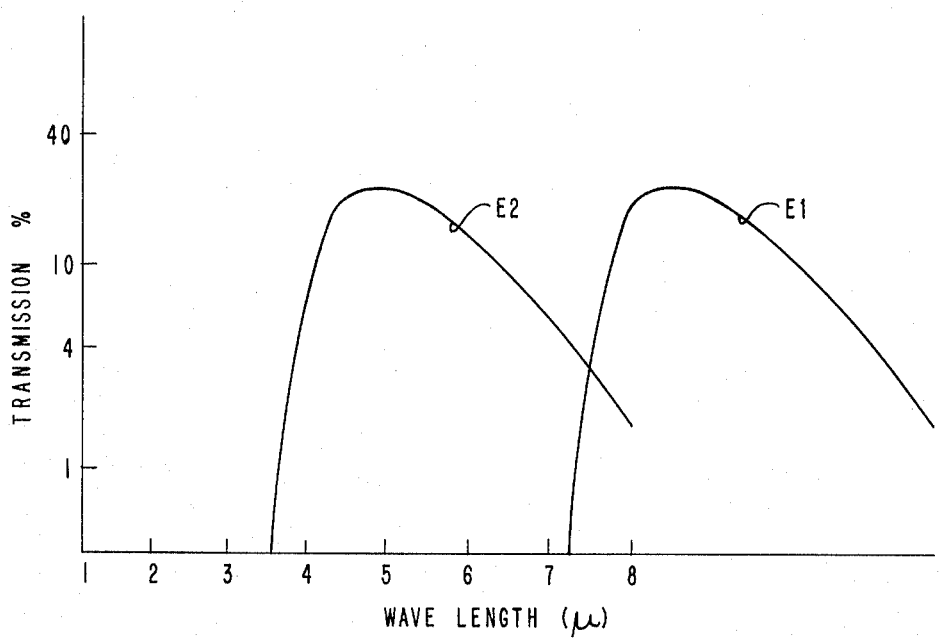

April 26, 1966 U. COCCA ET AL 3,247,765
LIGHT SWITCHING MEANS
Filed July 5, 1961 2 Sheets-Sheet 1
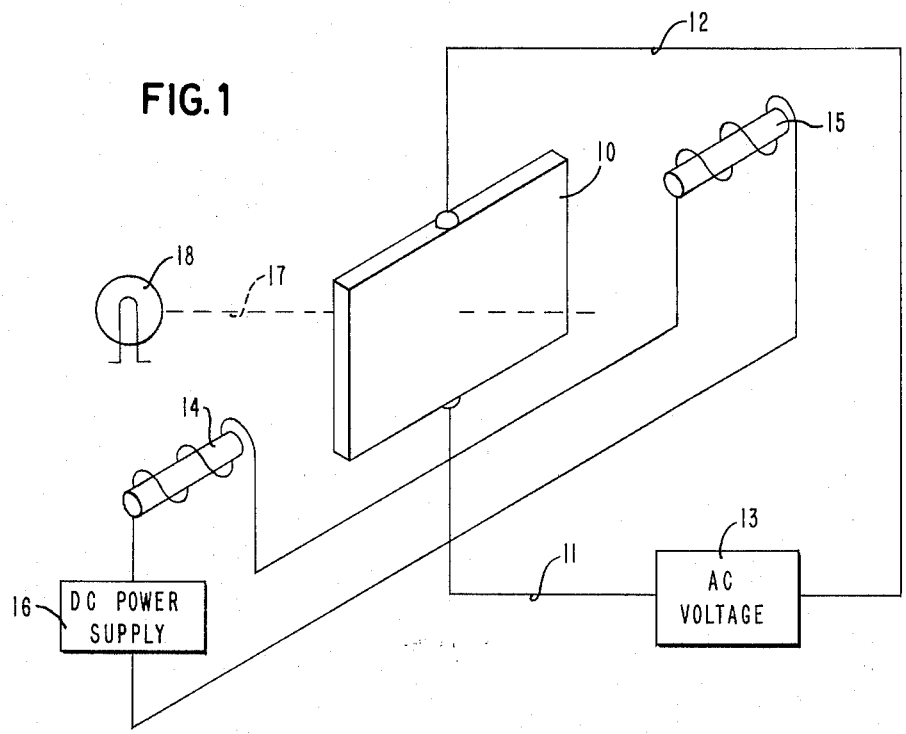
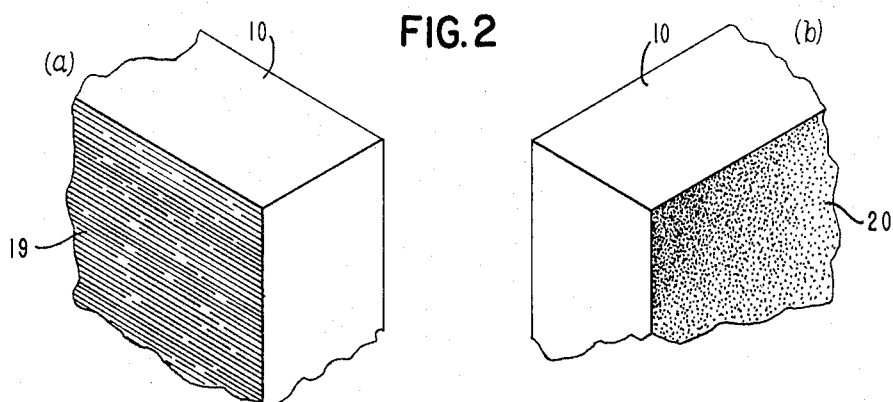
INVENTORS
UBERT COCCA
RAYMOND PECORARO
BY *George J. Netti*
ATTORNEY

United States Patent Office 3,247,765
Patented Apr. 26, 1966

3,247,765
LIGHT SWITCHING MEANS
Ubert Cocca, Apalachin, and Raymond Pecoraro, Wappingers Falls, N.Y., assignors to International Business Machines Corporation, New York, N.Y., a corporation of New York
Filed July 5, 1961, Ser. No. 121,954
6 Claims. (Cl. 88—61)

The present invention relates broadly to switching of a beam of light and in particular to a means for selectively controlling the intensity of such a beam.

In a number of different applications, an important functional operation is the switching or modulation of a beam of light, that is, the varying of the intensity of the beam between specified limits, or from extinction to one or more positive values of intensity.

Where a pulsating or modulated beam of relatively low or moderate frequency is required, there are conventional mechanical light interrupting means or shutter mechanisms which are satisfactory for most purposes. However, it is clear that there are practical limits in the frequency obtainable and in speed of response of such mechanical means. Additionally, if rather than a mere "on-off" condition of the light beam, it is desired to have a continuously variable light beam such as, for example, exhibiting a change in intensity representative of a sine wave function of high periodicity, mechanical shutter means are in general not satisfactory.

Briefly, the invention comprises locating a sheet of specially prepared semiconducting material in the path of a beam of light of relatively narrow bandpass so that the beam impinges on one major surface of the sheet and emerges from the other major surface. The sheet is subjected to a magnetic field and/or an electric field in the plane of the sheet. Selective variation of the field(s) effects a corresponding change in the transmissivity of the semiconducting material thereby providing the required light modulation or light shuttering.

It is therefore a primary object and purpose of the invention to provide a means for selectively varying the intensity of a beam of light at a predetermined rate and between preassigned magnitudes.

Another object of the invention is to provide a means for cyclically varying a light beam from extinction to predetermined intensity values.

A further object of the invention is the provision of a means for modulating a light beam in response to electrical and/or magnetic field stimulation.

Another object of the invention is the provision of a means for modulating a beam of light having the capacity for selective and continuous variation of the periodicity of modulation.

The foregoing and other objects, features and advantages of the invention will be apparent from the following more particular description of a preferred embodiment of the invention, as illustrated in the accompanying drawings.

In the drawings:

FIG. 1 is a diagrammatic representation of an embodiment of the invention.

FIG. 2, $a$ and $b$ is a perspective, fragmentary, enlarged view of a special modulating sheet for use in the embodiment of FIG. 1; and FIG. 3 is a graph showing certain electrical and optical characteristics of the modulating sheet of FIGS. 1 and 2.

For ease of understanding, a presentation of the pertinent fundamental physical facts upon which the operation of the invention depends is given at this time. FIG. 3 illustrates certain experimentally observed characteristics of a specific semiconducting material, indium antimonide (InSb), and particularly the relationship of transmissivity to the wavelength of incident light for two values of carrier concentration provided, respectively, by subjecting the sample to a constant magnetic field (H) and different electric fields (E1, E2 where E2 is greater than E1). Thus, it is seen that for a given particular constant value of electric and magnetic fields, a relatively high degree of light transmission is obtained for the given sample over a well-defined range of wavelengths with the transmission dropping off beyond this range, and quite sharply so, on moving toward the "blue."

It is by controlling the relation of this sharply changing portion of the curve, which will be referred to in the following description as an absorption edge, to an incident light beam that the novel light modulation technique of the invention is provided.

Assuming the magnetic field H to be maintained at a constant value, the graph indicates that an increase in the electric field impressed across the semiconductor sample results in a shifting of the absorption edge toward the blue, i.e., in the direction of shorter wavelengths. Accordingly, when the special sample was subject to a particular electrical field E1, incident electromagnetic radiation of, say, approximately 5 microns in wavelength suffers substantially complete extinction on passing therethrough. When, however, the electric field is increased to some higher value, E2, transmission for the same radiation range rises to approximately 20 percent.

Briefly, in explanation of this behavior, the light absorption characteristics of InSb have been found to be directly dependent on the extrinsic carrier concentration of the semiconductor, i.e., the number of holes and conduction electrons per unit volume. Accordingly, as the concentration increases the absorption edge corresponding to direct optical transition occurs at shorter wavelengths or, on the other hand, decreasing the carrier concentration results in a shifting of the absorption edge toward longer wavelengths. A more complete discussion of solid-state semi-conducting materials and their carrier concentration characteristics is set forth in the text Optical Properties of Semiconductors by T. S. Moss, Academic Press, Incorporated (1959), pages 231–234.

As already noted, the carrier concentration of semi-conducting materials can be controlled in a given sample by selective variation of the magnitudes of electric and magnetic fields simultaneously impressed thereon. A full presentation of the more theoretical physical aspects involved in this type of control can be found in the article entitled Magnetic Barrier Layer in Germanium by E. Weisshaar and H. Welker in the publication Z. Naturforschung (1953).

Turning now particularly to FIG. 1, there is shown an embodiment of the invention which includes a modulating sheet 10 composed of a semiconducting material having its major surfaces treated in a special way as will be set forth below. A pair of conductors 11 and 12 are electrically connected to opposite edges of the sheet 10 for providing connection to a selectively variable source of supply 13 of A.C. voltage. A pair of electromagnets 14 and 15 are arranged along opposite edges of the sheet 10 for directing a magnetic field in the plane of the sheet and transversely of the direction of flow of electric current provided to the sheet through the conductors 11 and 12. The electromagnets 14 and 15 are series connected to a suitable D.C. power source 16 which is controllable to provide a selectively variable output over a given voltage range. A beam of light 17 is directed toward the sheet from a narrow bandpass light source 18.

For the more detailed features of the modulating sheet 10 used in the embodiment of FIG. 1, reference should now be made to FIG. 2. The sheet is composed of N-type InSb of substantially square geometry 1 centimeter along each edge and has a thickness of approximately 30 microns. The principal surface 19 (FIGURE 2a) which first intercepts the light beam from the source 18 is specifically prepared to form what is termed in the above-noted reference material, a low recombination surface. Thus, by etching the surface 19 with a large number of closely spaced lines, the recombination velocity of the surface can be brought to a value of approximately 1000 cm./sec. The other principal surface 20 (FIGURE 2b), from which the modulated beam is emitted, is treated by sandblasting, for example, to provide what is termed a high recombination surface. By such a treatment, the recombination velocity in the regions adjacent this surface is in excess of 1,000,000 cm./sec.

The special treatment of the surfaces 19 and 20 co-operatively functions with the magnetic and electric fields to control the carrier concentration in the sheet 10 to an enhanced degree thereby effecting improved control of variation of the absorption edge of a modulation sheet subjected to given electric and magnetic fields.

Although either N- or P-type materials are satisfactory for the purposes of the invention, the N material is slightly superior in this respect and, for that reason, is specified in the above description.

Also in this connection, the thickness of the sheet 10 must be kept to such a value as to be able to provide a sufficiently high transmission for the intended use. This, of course, can vary depending on a particular use, however, for illustrative purposes a 30 micron sheet of InSb can provide a maximum transmission of approximately 20 percent which was fully satisfactory for present purposes.

When the semiconductor sheet of the described character is subjected to a magnetic field of 10,000 gauss and an electric field of 2.1 volts/cm. in the mutually orthogonal directions indicated in FIGURE 1, an absorption edge is found to exist at approximately 7.3 microns (FIG. 3). On reversing the electric field (or the magnetic field) the absorption edge is shifted so as to be in a region of about 3.6 microns. Thus, an incident monochromatic light beam of, say, 4.5 micron wavelengths under the first set of electric and magnetic field conditions is substantially extinguished, whereas under the second set of conditions about 20 percent of the light beam is transmitted through the modulating sheet. By changing the electric field some lesser amount, or between different limits intermediate those stated above, while maintaining the fixed magnetic field, a full and varied range of light modulation capability is obtained.

In the above description, the magnetic field, H, is fixed to some value while changes in transmission are effected by appropriate variation of the impressed electric field. Fully satisfactory results are also obtainable by maintaining a constant electric field in the sheet 10 and relying on selective variation of the magnetic field to achieve modulation or shuttering.

There is a definite relation between the particular material, or materials, composing the novel modulating sheet of the above-described devices and the range of wavelengths of radiation that can be effectively controlled thereby, and this is irrespective of the magnitude of the associated magnetic and/or electric field. Accordingly, although InSb is a fully satisfactory material for use with radiation in the range of about 4–8 microns, the efficiency of shuttering or modulating in the sense meant here falls off rapidly for radiation substantially beyond this range.

Other solid state semiconducting materials, such as germanium for example, exhibit the required variable transmissivity and which transmissivity for any particular material is more pronounced over a certain frequency range characteristic of the material. Accordingly, a number of different materials can be used to practice the invention thereby providing a highly desirable flexibility in the wavelengths of light which can be so controlled.

While the invention has been particularly shown and described with reference to a preferred embodiment thereof, it will be understood by those skilled in the art that the foregoing and other changes in form and details may be made therein without departing from the spirit or scope of the invention.

What is claimed is:
1. A light control means, comprising:
   (a) a light source having a narrow beam bandwidth lying within 4–8 microns arranged to direct a beam of light along a definite path;
   (b) a sheetlike body of N-type indium antimonide (InSb) disposed in the path of said beam so that light from said source impinges substantially orthogonally on a major surface;
   (c) a magnetic field generating means located adjacent an edge of said body for directing a substantially constant magnetic field coplanar with said body; and
   (d) means interconnecting opposite edges of said body for directing a selectively variable current therethrough to establish an electric field in said body substantially orthogonal to both the magnetic field and the direction of propagation of said light beam whereby carrier concentration of said body is varied in a controlled manner to provide corresponding transmissivity changes with consequent modulation of the light beam.

2. A light switch for controlling a narrow bandpass beam of light directed along a definite path, comprising:
   a body of material having a negative temperature coefficient of resistance and a variable radiation absorption edge arranged in the path of said beam;
   electric field generating means for establishing an electric field across said body; and
   magnetic field generating means disposed adjacent said path for directing a field across said body transversely of said electric field, said magnetic and electrical fields being simultaneously activated by their respective means to control the intensity of said beam emanating from said body, said path having a direction different from the directions of each of said fields.

3. A light switch, as in claim 2, in which said electric field generating means comprises a selectively variable source of alternating voltage and connecting means at opposite edges of said body for passing a current along a path therethrough.

4. A light switch, as in claim 2, in which said magnetic field generating means comprises a pair of serially connected electromagnets arranged at opposite sides of said slab for providing constant unidirectional field.

5. A light switch, as in claim 2, in which the negative resistance body consists of N-type indium antimonide material in sheetlike form.

6. A light switch, as in claim 2, in which said electric field means fluctuates between two such limits as to provide for cyclic extinction of the light beam separated by periods of relatively high light transmission.

References Cited by the Examiner

UNITED STATES PATENTS

| | | | |
|---|---|---|---|
| 2,750,832 | 6/1956 | Morgan | 88—61 |
| 2,929,923 | 3/1960 | Lehovec | 88—61 |
| 2,987,959 | 6/1961 | Kimmel | 88—61 |
| 3,011,070 | 11/1961 | Glicksman | 307—88.5 |
| 3,012,183 | 12/1961 | Robinson | 307—88.5 |
| 3,025,763 | 3/1962 | Schwartz et al. | 88—61 |
| 3,160,762 | 12/1964 | Steel et al. | 88—23 |

FOREIGN PATENTS

Burstein et al.: "Magnetic Optical Bank Gap Effect in InSb," Physical Review, vol. 103, No. 3, Aug. 1, 1956, pages 826–828.

JEWELL H. PEDERSEN, *Primary Examiner.*